(12) United States Patent
Silsby et al.

(10) Patent No.: US 12,162,555 B2
(45) Date of Patent: Dec. 10, 2024

(54) CONTROL DEVICE FOR AN ELECTRIC BICYCLE

(71) Applicant: Rad Power Bikes Inc., Seattle, WA (US)

(72) Inventors: Jake Silsby, Seattle, WA (US); Dave Miller, Seattle, WA (US)

(73) Assignee: Rad Power Bikes Inc., Seattle, WA (US)

( * ) Notice: Subject to any disclaimer, the term of this patent is extended or adjusted under 35 U.S.C. 154(b) by 750 days.

(21) Appl. No.: 17/139,593

(22) Filed: Dec. 31, 2020

(65) Prior Publication Data

US 2022/0204110 A1    Jun. 30, 2022

(51) Int. Cl.
| | |
|---|---|
| *B62J 45/20* | (2020.01) |
| *B62J 43/13* | (2020.01) |
| *B62J 50/21* | (2020.01) |
| *B62J 50/22* | (2020.01) |
| *B62L 3/02* | (2006.01) |
| *B62M 6/45* | (2010.01) |
| *B62M 6/90* | (2010.01) |

(52) U.S. Cl.
CPC .............. *B62J 45/20* (2020.02); *B62J 43/13* (2020.02); *B62J 50/22* (2020.02); *B62J 50/225* (2020.02); *B62L 3/02* (2013.01); *B62M 6/45* (2013.01); *B62M 6/90* (2013.01)

(58) Field of Classification Search
CPC . B62J 45/20; B62J 50/22; B62J 50/225; B62J 43/13; B62L 3/02; B62M 6/45; B62M 6/90
See application file for complete search history.

(56) References Cited

U.S. PATENT DOCUMENTS

| | | | | |
|---|---|---|---|---|
| 5,625,336 A | * | 4/1997 | Yamamoto | B62J 50/22 340/432 |
| 6,204,752 B1 | * | 3/2001 | Kishimoto | B62J 50/22 340/432 |
| 6,227,068 B1 | * | 5/2001 | Masui | B62M 25/08 74/473.3 |

(Continued)

FOREIGN PATENT DOCUMENTS

| | | |
|---|---|---|
| KR | 20100116070 A | 10/2010 |
| KR | 20120011236 A | 2/2012 |

OTHER PUBLICATIONS

International Search Report and Written Opinion dated Apr. 13, 2022 for International Patent Application No. PCT/US2021/063347.

(Continued)

*Primary Examiner* — Kevin Hurley
*Assistant Examiner* — Michael R Stabley
(74) *Attorney, Agent, or Firm* — AMPACC Law Group, PLLC

(57) ABSTRACT

An electric bicycle control device, and associated display device, are described. The control device, in some embodiments, includes an LED (light emitting diode) indicator (e.g., alphanumeric display) that presents information to riders of the electric bicycle, as well as various control buttons that facilitate rider control of the electric bicycle. The control device is associated with a display device, which presents additional or complementary information about the electric bicycle, such as information that is presented based on input received via the control device from the rider.

16 Claims, 14 Drawing Sheets

(56) References Cited

U.S. PATENT DOCUMENTS

| | | | | |
|---|---|---|---|---|
| 6,538,221 | B1* | 3/2003 | Nishimoto | B62J 50/21 |
| | | | | 200/334 |
| 6,682,087 | B1* | 1/2004 | Takeda | B62K 23/00 |
| | | | | 701/52 |
| 6,734,376 | B2* | 5/2004 | Ichida | B62M 25/08 |
| | | | | 200/332.2 |
| 6,917,283 | B2* | 7/2005 | Takeda | B62K 23/00 |
| | | | | 340/432 |
| 7,065,434 | B2* | 6/2006 | Uno | B62M 25/08 |
| | | | | 474/70 |
| 8,812,174 | B2* | 8/2014 | Ohshima | B62K 11/14 |
| | | | | 701/99 |
| 9,284,016 | B2* | 3/2016 | Takamoto | H02J 1/14 |
| 9,604,696 | B2* | 3/2017 | Miyoshi | B62M 6/90 |
| 9,682,743 | B2* | 6/2017 | Miyoshi | B62J 50/22 |
| 10,029,759 | B2* | 7/2018 | Miyoshi | B62M 6/45 |
| 10,086,708 | B2* | 10/2018 | Ichida | B60G 17/0195 |
| 10,625,817 | B2* | 4/2020 | Kishita | B62J 6/028 |
| 2004/0113385 | A1 | 6/2004 | Uno | |
| 2004/0239489 | A1 | 12/2004 | Takeda | |
| 2016/0016638 | A1 | 1/2016 | Miyoshi et al. | |

OTHER PUBLICATIONS https://www.bosch-ebike.com/us/products/displays/ (Dec. 27, 2019).

* cited by examiner

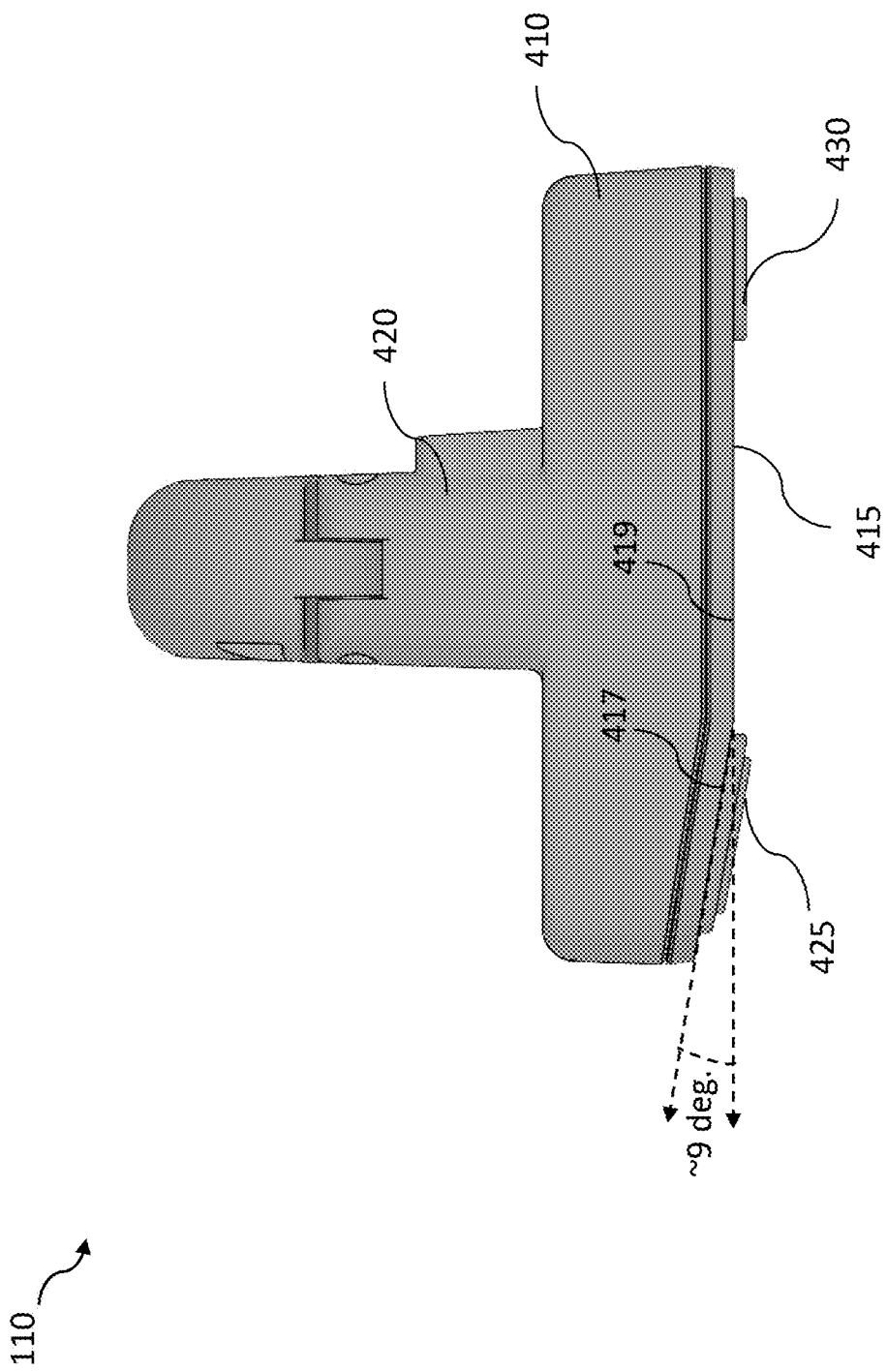

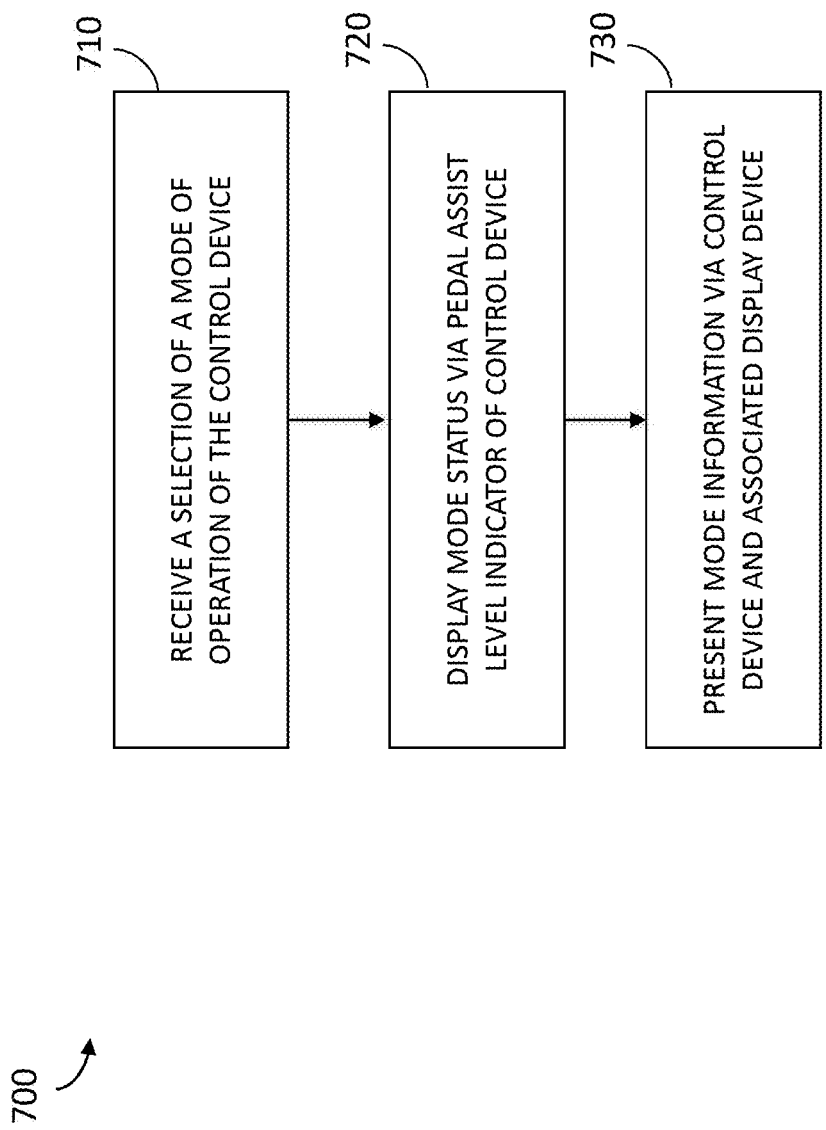

CONTROL DEVICE FOR AN ELECTRIC BICYCLE

BACKGROUND

Electric bicycles, or e-bikes, are a popular method of transportation for use by individual riders, families, commercial enterprises and fleets, and so on. Unlike traditional bikes, an e-bike provides assisted modes of travel to a rider, including a peddle assist mode that utilizes power from a motor to assist the rider in pedaling and/or a throttle mode where the motor, when engaged, powers the e-bike without any pedaling from the rider.

Many e-bikes provide a control or display that presents information to the rider during a ride, as well as facilitates receiving input from the rider during the ride. However, conventional controls and displays can be awkward to use when riding on an e-bike, and present limited information within their small-sized interfaces.

BRIEF DESCRIPTION OF THE DRAWINGS

Embodiments of the present technology will be described and explained through the use of the accompanying drawings.

FIGS. 4A-4C are diagrams illustrating the control device of the electric bicycle.

FIG. 7 is a flow diagram illustrating a method of presenting information to a rider of the electric bicycle via the user interface of the control device.

Figure 1:
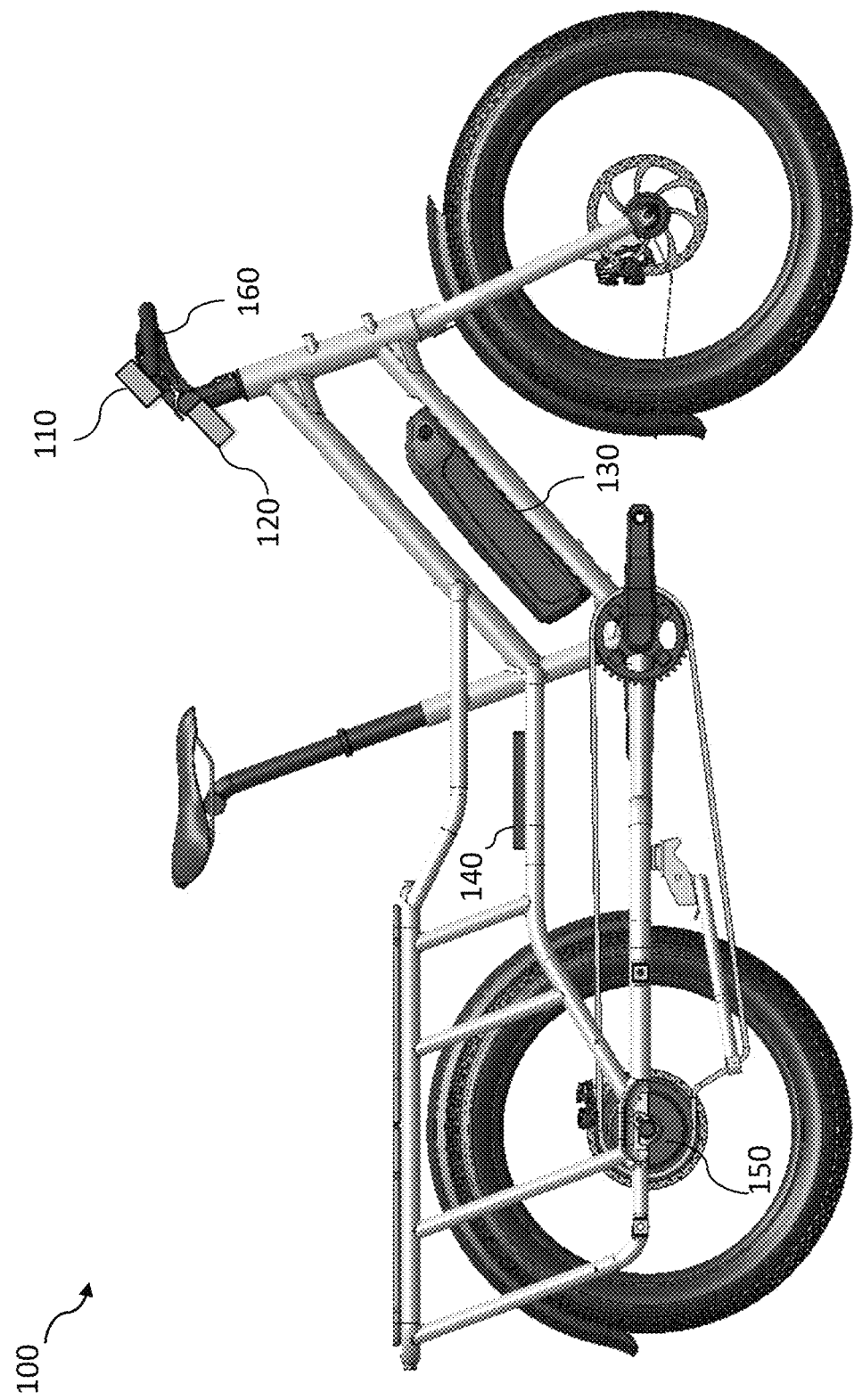
FIG. 1 is a side view of an electric bicycle with associated control and electrical systems.

In the drawings, some components are not drawn to scale, and some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the particular implementations described. On the contrary, the technology is intended to cover all modifications, equivalents, and alternatives falling within the scope of the technology as defined by the appended claims.

DETAILED DESCRIPTION

Overview

An electric bicycle control device, and associated display device, are described. The control device, in some embodiments, includes an LED (light emitting diode) indicator (e.g., alphanumeric display) that presents information to riders of the electric bicycle, as well as various control buttons that facilitate rider control of the electric bicycle. The control device is associated with a display device, which presents additional or complementary information about the electric bicycle, such as information that is presented based on input received via the control device from the rider.

The control device utilizes the LED indicator to present various types of information. For example, the LED indicator presents alphanumeric values (e.g., 0-9) that indicate a current level of operation associated with a peddle assist system (PAS) for the e-bike. However, in some cases, the LED indicator presents other, non-alphanumeric, information, such as information that indicates a different mode of operation of the e-bike (e.g., a walk mode) and/or that indicates the control device is presenting information associated with a status of the e-bike or components of the e-bike (e.g., an error code or status information).

Further, the control device can include a housing and associated display surfaces that facilitate easy or comfortable engagement of the control device for the rider of the electric bicycle. For example, the user interface of the control device can include two or more surfaces positioned at an angle from one another (e.g., 8-20 degrees, with respect to one another). The various angled surfaces can facilitate a more comfortable selection of buttons by a rider when the rider is gripping the handlebars of the e-bike, while also presenting information to the rider at an angle (e.g., a viewing angle) most easily viewable by the rider when riding the e-bike.

Thus, in various embodiments, the control device (and associated display) has a geometry that enables a rider of an electric bicycle to control the operation of the bicycle (e.g., select a certain peddle assist level) via buttons positioned to accommodate the rider's hands and fingers when gripping the handlebars, brake levers, or shifters of the bicycle, among other benefits.

Further, the control device utilizes an LED indicator to present alphanumeric information as well as other information associated with the electric bicycle and its operation, enabling the control device to provide a bright, clear display of information via the LED alphanumeric display that is not limited to alphanumeric values, among other benefits. Also, the control device, when paired with an associated display device, presents users with additional and complementary information about the electric bicycle, the status of various components of the e-bike, and so on. Such information is navigable and selectable by a rider, via the control device, enabling the rider to view the information they wish via input provided to the control device, among other benefits.

While described herein with respect to an electric bicycle, in some embodiments aspects of the security devices and systems described herein can be configured or utilized with other bicycles or cycles, electric scooters or other wheeled micro-mobility vehicles, mopeds, and so on.

Various embodiments of the control device and/or display device will now be described. The following description provides specific details for a thorough understanding and an enabling description of these embodiments. One skilled in the art will understand, however, that these embodiments may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments.

Examples of the Control Device and Electric Bicycle

As described herein, the control device (and associated display device) acts to facilitate user or rider control of an electric bicycle. FIG. 1 depicts an electric bicycle 100 that incorporates many of the various features of the technology described herein. As depicted, the electric bicycle, or e-bike, is a long-tail cargo bike, and is configured to be propelled either by human pedaling of the e-bike and/or via an electric motor that assists the human's pedal-power or propels the e-bike without pedaling (similar to a moped or scooter).

A control device 110, such as the various control devices described herein, is fixed to or positioned on the electric bicycle 100 on handlebars 160, such as proximate to a brake lever or shifter of the e-bike 100. A display device 120, such as a device that displays information associated with the control device 110, is also positioned on the handlebars 160, such as at a center position of the handlebars 160.

The electric bicycle 100 also includes a battery pack 130 positioned and/or mounted to a down tube, a controller 140 mounted to seat stays, and an electric motor 150 mounted to the rear wheel. During operation of the electric bicycle 100, the battery pack 130 provides power to the electric motor 150, which propels the bicycle under control of the controller 140. The controller 140 can receive commands via the control device 110, as well as provide information to the control device 110 and/or display device 120 for presentation to the rider of the electric bicycle 100.

Figure 2:
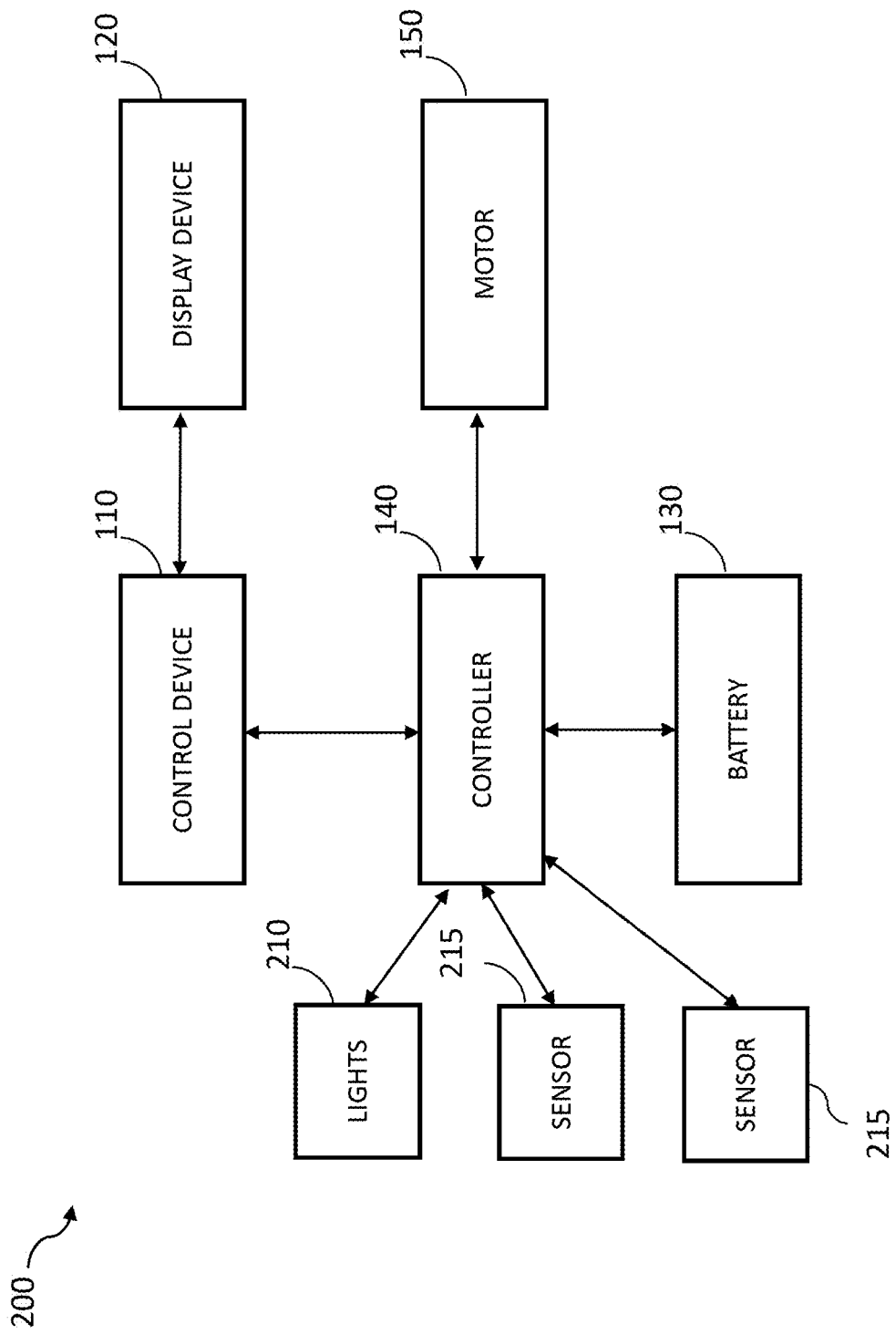
FIG. 2 is a block diagram illustrating various components of the electric bicycle.

FIG. 2 is a block diagram 200 illustrating various components of the electric bicycle 100. As depicted, the control device 110, via input received from the rider, can send instructions to the controller 140 to change a pedal assist level of operation of the electric bicycle 100, can sent instructions to turn on/off various lights 210 of the electric bicycle 100, can send instructions to change a mode of operation of the electric bicycle (e.g., from ride mode to walk mode), can send instructions to various sensors 215, and so on.

Further, the control device 110, via input received from the rider, can request information from the controller 140, such as information associated with a current status or level of charge of the battery 130, information associated with current parameters of the motor 150, information captured by the one or more sensors 215, and so on. Such information, as described herein, can be presented to the rider via the user interface of the control device 110 and/or the display device 120.

In addition to the components depicted in FIG. 1, the electric bicycle 100 can include other components not shown, such as pedals, brakes and braking systems, various accessories, fenders, various types of rims, tires, or wheels, locking or security systems, lights and reflectors, bells or other audible alert systems, GPS, screens, and/or other user interfaces or display devices, and so on.

In some cases, the control device 110 is connected via a wired connection to the controller 140 and display device 120. However, in other cases, the connections can be wireless and utilize various wireless communication protocols, including cellular communication, Bluetooth® communication, Near-Field Communication (NFC), Radio Frequency Identification (RFID) communication, and/or other communication protocols.

Also, while the control device 110 is, in some cases, powered by the battery 130 of the electric bicycle 100, other energy sources can be utilized. For example, in cases where the control device 110 is a wireless device not connected via wires to other components of the electric bicycle 100, the control device 110 can include a battery, recharge battery, a solar energy harvesting component, a vibration energy harvesting component, and so on. Thus, the control device 110 can, in some cases, power itself when used with the electric bicycle 100.

Further, the control device 110, in some cases, can communicate with a mobile device associated with the rider, where the mobile device (e.g., via an associated mobile application) acts as an associated display, similar to the display device 120. Also, the control device 110 can directly communicate with other systems, such as systems that manage fleets of electric bicycles, smart city systems and servers, and so on. Thus, while in some cases the electric bicycle itself can act as a node of a network, the control device 110 can also act or function as the node of the network, such as an IoT device on a network of managed devices.

FIGS. 1, 2, and the components depicted herein, provide a general computing environment and network within which the control device can be implemented. Further, the systems, methods, and techniques introduced here can be implemented as special-purpose hardware (for example, circuitry), as programmable circuitry appropriately programmed with software and/or firmware, or as a combination of special-purpose and programmable circuitry. Hence, implementations can include a machine-readable medium having stored thereon instructions which can be used to program a computer (or other electronic devices) to perform a process. The machine-readable medium can include, but is not limited to, floppy diskettes, optical discs, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other types of media/machine-readable medium suitable for storing electronic instructions.

A network can be any network, ranging from a wired or wireless local area network (LAN), to a wired or wireless wide area network (WAN), to the Internet or some other public or private network. While the connections between the various devices and the network and are shown as separate connections, these connections can be any kind of local, wide area, wired, or wireless network, public or private.

Further, any or all components depicted in the Figures described herein can be supported and/or implemented via one or more computing systems or servers. Although not required, aspects of the various components or systems are described in the general context of computer-executable instructions, such as routines executed by a general-purpose computer, e.g., mobile device, a server computer, or personal computer. The system can be practiced with other communications, data processing, or computer system configurations, including: Internet appliances, hand-held devices (including tablet computers and/or personal digital assistants (PDAs)), all manner of cellular or mobile phones, multi-processor systems, microprocessor-based or programmable consumer electronics, set-top boxes, network PCs, mini-computers, mainframe computers, AR/VR devices, and the like. Indeed, the terms "computer," "host," and "host computer," and "mobile device" and "handset" are generally used interchangeably herein and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Portions of the system may reside on a server computer, while corresponding portions may reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

Examples of the Control Device and Associated Display Device

Figure 3A:
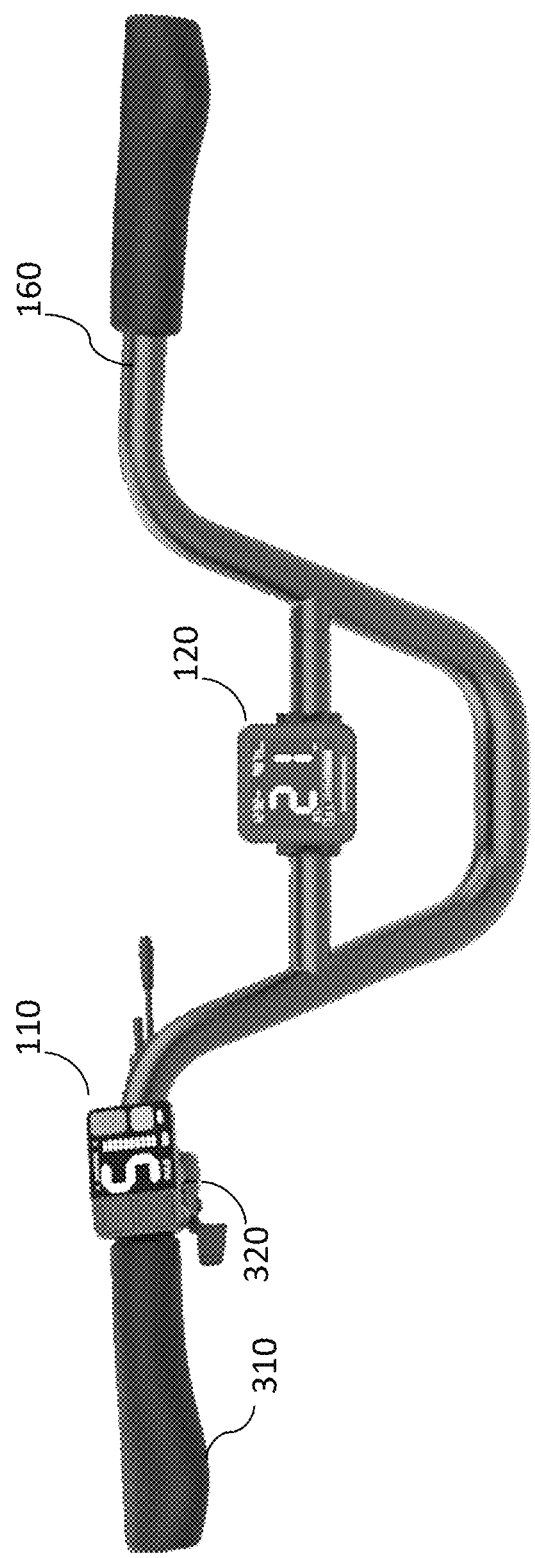
FIG. 3A is a diagram illustrating a control device and associated display device for the electric bicycle.
Figure 3B:
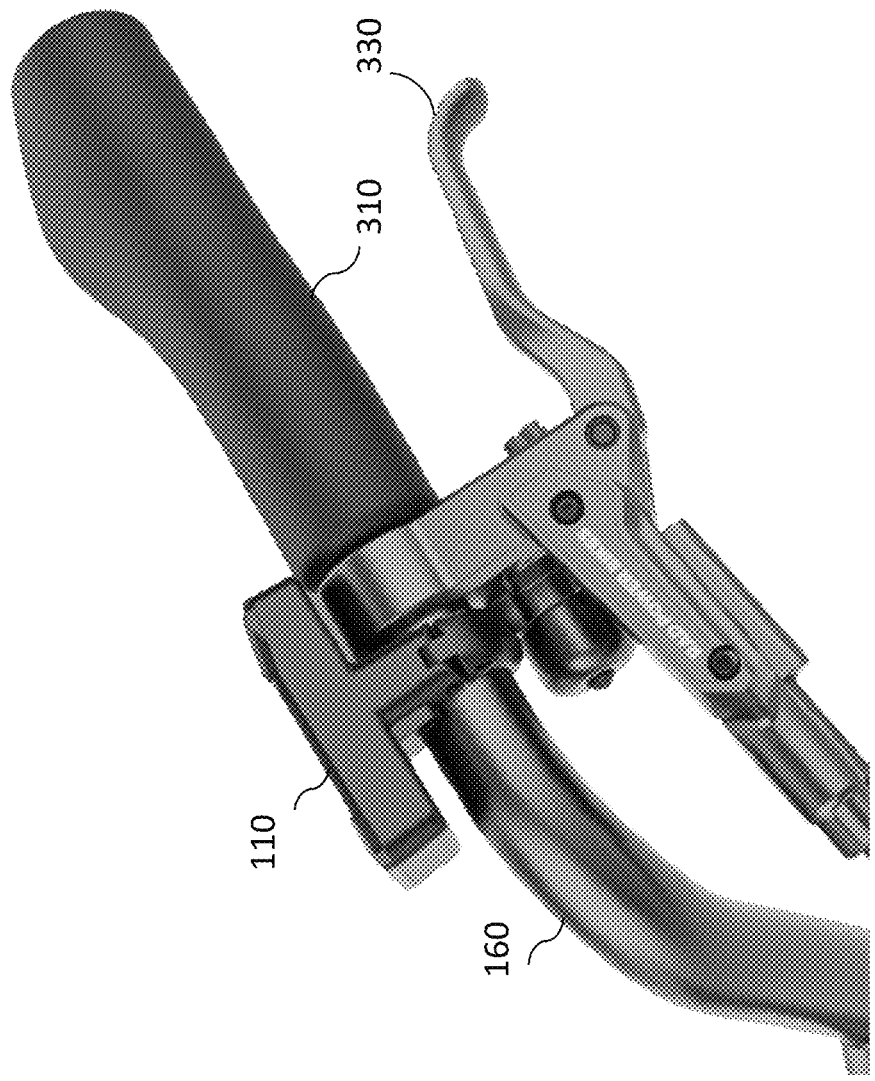
FIG. 3B is a diagram illustrating the control device fixed to handlebars of the electric bicycle.

As described herein, in some embodiments, the control device 110 is disposed on the handlebars 160 of the electric bicycle 100. FIGS. 3A-3B are diagrams illustrating the control device 110 and display device 120 mounted to the handlebars 160 of an electric bicycle. The control device 110 is positioned on a left portion of the handlebars 160, next to a grip 310 and gear shifter 320. The display device 120 is positioned centrally on the handlebars 160, although in some cases could be placed on a right portion of the handlebars 160. Further, the control device 110 can be positioned on the other side of the handlebars 160, depending on the preference of the rider.

As shown in FIG. 3B, the control device 110 is also positioned near a brake lever 330 that is utilized by the rider when applying the brakes during a ride. Thus, the control device 110, positioned near the brake lever 330, enables a rider to engage the control device 110 (e.g., via his/her/their thumb) and brake lever 330 (e.g., via his/her/their fingers) during a normal gripping of the handlebars 160.

Figure 4A:
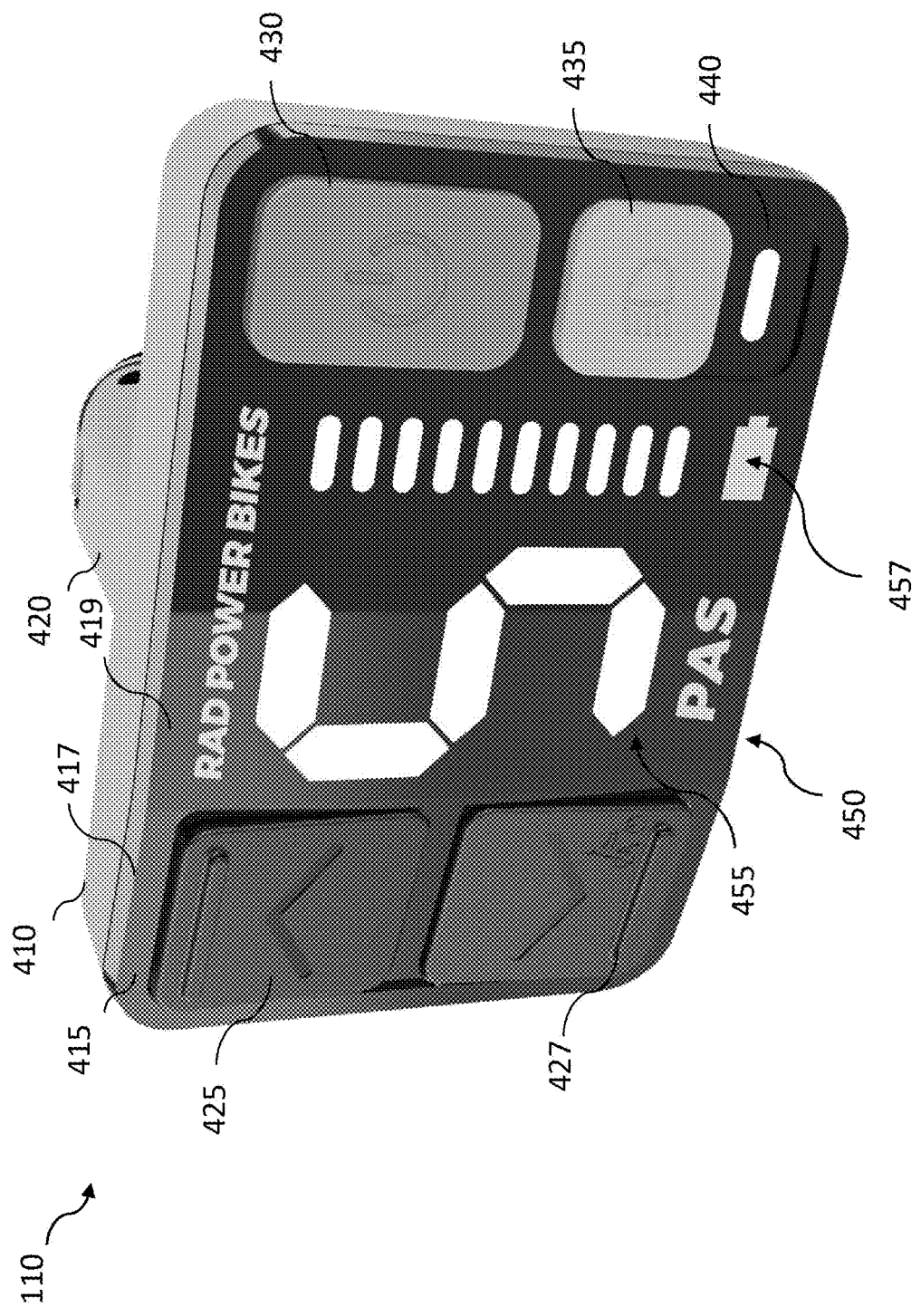
Figure 4C:
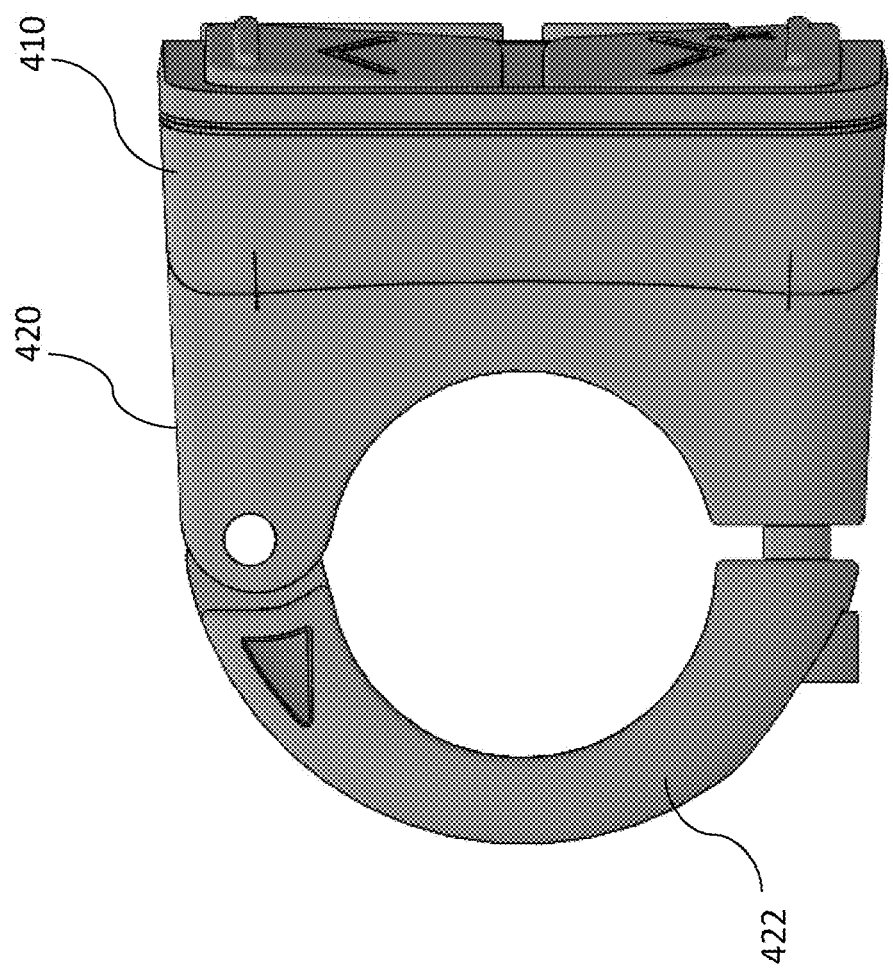

FIGS. 4A-4C illustrate various aspects of the control device 110. As depicted in FIG. 4A, the control device 110 includes a housing 410 and a front surface 415. The housing 410 contains the control circuitry and all electronics suitable for illuminating the control device 110 and sending/receiving instructions to/from the controller 140. For example, the housing 110 can partially enclose circuitry to drive and control a 7 segment alphanumeric LED display, which presents information via the front surface 415.

The housing 410 is fixed to a holder 420 or attachment arm, which is configured to attach the control device 110 to the handlebars 160 of the electric bicycle 110. The holder 420 can include a clamp 422, as depicted in FIG. 4C, or other attachment mechanism that removably secures the control device 110 to the handlebars 160.

The front surface 415, in some embodiments, is formed of multiple (two or more) surfaces that meet at an angle with one another, where the front surface 415 includes a first surface 417 disposed at a slight angle from a second surface 419. For example, FIG. 4B depicts a two-dimensional plane that includes the first surface 417 intersects at an angle of approximately 9 degrees (e.g., 9.4 degrees) with a plane that includes the second surface 419. In some configurations, the range of measures of the angle may be between 8-20 degrees.

For example, in such cases, the second surface 419 is configured to face directly to the rider, whereas the first surface 417 is configured to face slightly away from the rider (but at an angle to accommodate the rider's thumb to comfortably engage the front surface 415 when interacting with the control device 110). In some cases, the shape of the housing 410 may also have a similar angled configuration to match the configuration of the front surface 415.

The front surface 415 provides a user interface for the control device 110. The front surface includes user-selectable physical buttons 425 that facilitate the selection of different levels of control, a user-selectable physical power button 430, a user-selectable physical lights button 435, and various LED display elements. The LED display elements include a lighting indicator 440 (e.g., which indicates whether lights on the e-bike 100 are on or off), and an LED display 450, which presents information associated with a pedal assist system (PAS) 455 via an alphanumeric display, and information associated with a battery level 457 via a bar level indicator.

As depicted, the control buttons 425, which are configured to receive user input regarding the changing or modifying of a PAS level for the e-bike 410, are part of the first surface 417 of the front surface 415, and thus are angled slightly away from the rider (and from the second surface 419) to better and more comfortably accommodate a user providing input via his/her/their thumb when gripping the handlebars 160.

The control buttons 425 also include features or elements to facilitate ease or security of use by a rider. For example, the buttons 425 include a ridge 427 or raised element to facilitate and guide the rider in contacting the button while riding. Further, the buttons 425 have a triangular shape, where each button is raised along an edge of the front surface 415 and slope down towards the center of the front surface 415. Thus, the shape of the control buttons 425, the addition of guidance elements, and/or the positioning of the buttons at a slight angle away (e.g., via the first surface 417) from the information displayed by the control device 110 enables a rider to easily and safely (e.g., without directly looking) engage with the button 425 during a ride.

The power button 430, when selected by the rider, powers on the control system of the electric bicycle 100. Further, the lights button 435 enables the rider to turn the lights of the e-bike 100 on or off (or, in some cases, engages some of the lights of the electric bicycle 100). The status of the lights is provided by the lights indicator 440.

The LED display 450, as described herein, is controlled by the control buttons 425. For example, when a rider selects the top button, the PAS level 455 is increased by one (e.g., from 4 to 5, as shown). Also, selection of the lower button decreases the PAS level 455 by one (e.g., from 5 to 4). The LED display 450 also presents information 457 about the battery level (e.g., as depicted, the battery is full as all bars are illuminated by the display 457).

Further, in some embodiments, the LED display 450 can include multiple alphanumeric displays 455 (e.g., two displays next to one another, or one display on top of another display) in order to depict two or more numbers or values. For example, having two displays facilitates the display of the traveling speed of a bicycle via the LED display 450.

Additional functionality associated with the LED display 450 and control buttons 425 are described herein.

Figure 5:
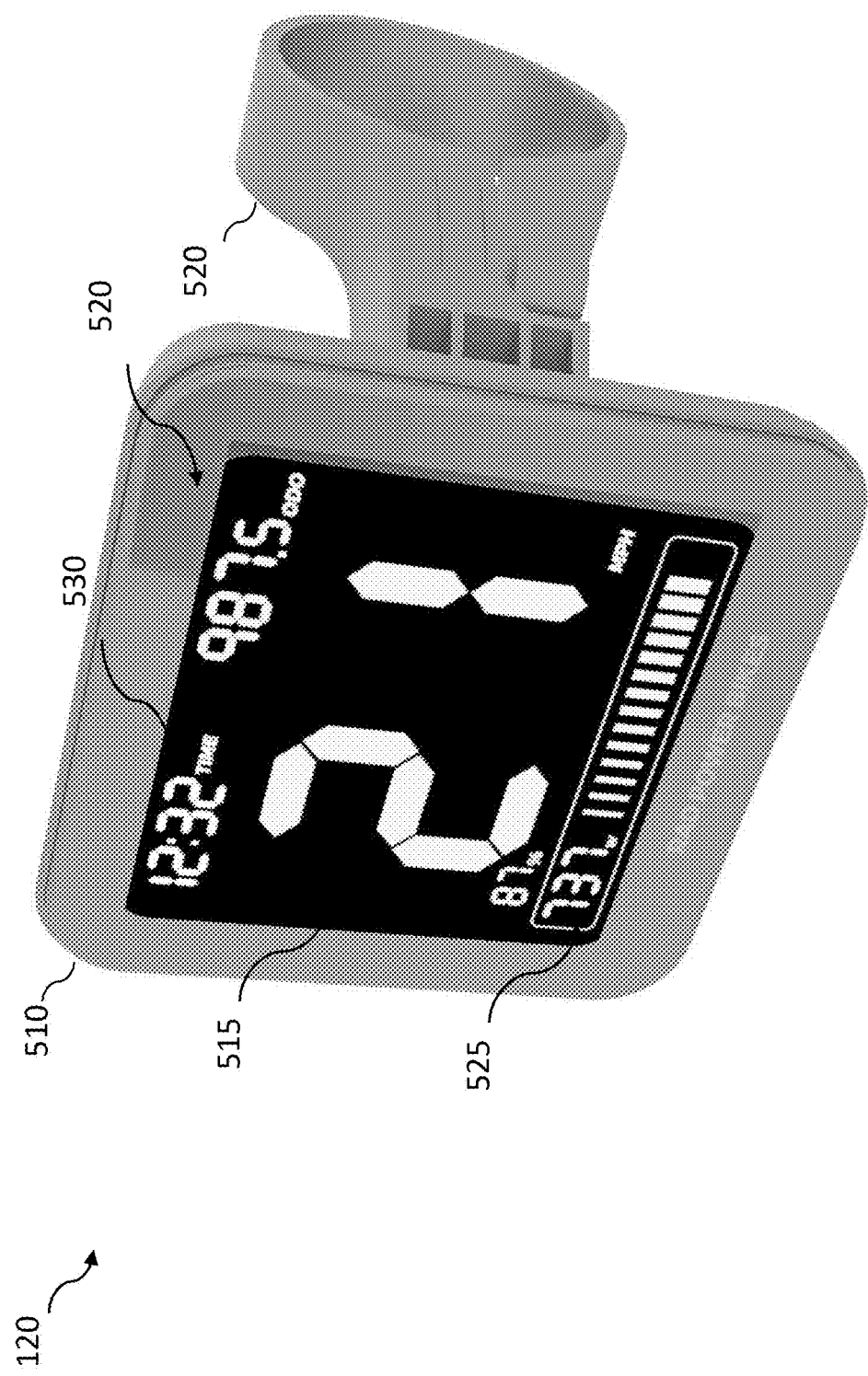
FIG. 5 is a diagram illustrating the display device of the electric bicycle.

FIG. 5 illustrates various aspects of the display device 120. As described herein, in some embodiments, the display device 120, and the information presented by the display device 120, is controlled by rider input received via the control device 110. Thus, the display device 120 can act as an extension, or second screen, for the control device 110.

The display device 120 includes a user interface 510, such as an interface provided by a liquid crystal display (LCD) or other similar display. The interface 510 is positioned via a holder or attachment arm 520, which is configured to fix the LCD display to the handlebars 160 of the e-bike 100. For example, the display device 120 can be removably clamped or otherwise fixed to a center portion of the handlebar 160 or to one side of the handlebars 160.

The user interface 510 displays various types of information, including speed information 515 (e.g., how fast the e-bike is traveling), odometer information 525 (e.g., how far the e-bike has traveled), power information 525 (e.g., how many Watts are in current use by the e-bike, as well as bars that show the current use within the context of maximum available use), the time of day 530, and other information that reflects the status of the e-bike and/or its current use or trip (not shown).

As described herein, the control device 110 and/or display device 120 can display various types of information that reflect the status of the e-bike 100, the status of one or more components (e.g., the battery 130 or motor 150), the mode of operation, and so on. FIGS. 6A-6J depict different types of information displayed by the control device 110 and/or display device 120.

Figure 6A:
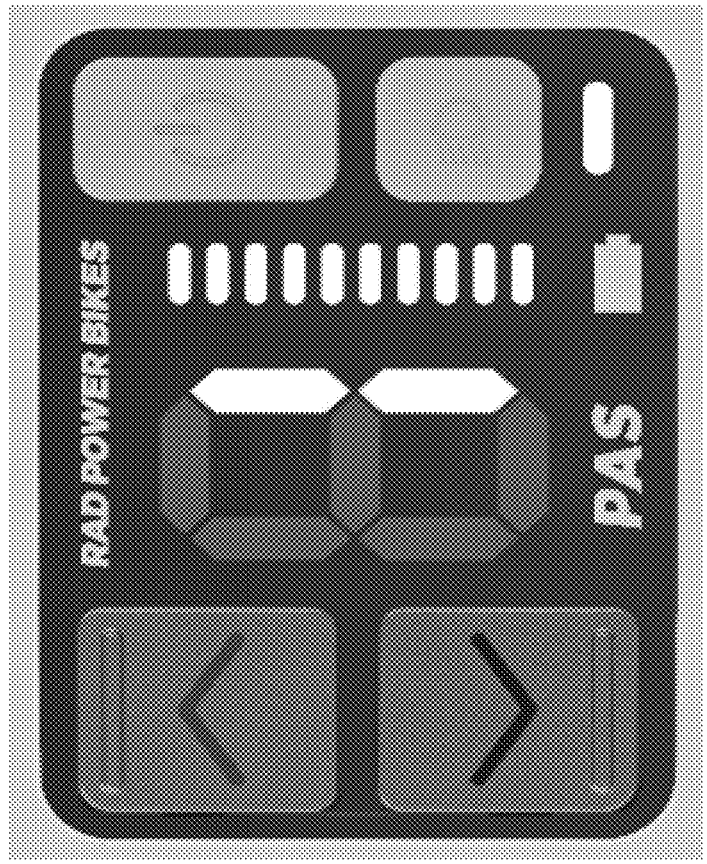
FIGS. 6A-6J are display diagrams illustrating information displayed by a user interface of the control device.

FIG. 6A presents a normal mode of operation, where a user interface 600 of the control device 110 presents a current PAS level and current battery level for an associated electric bicycle, such as electric bicycle 100.

Figure 6D:
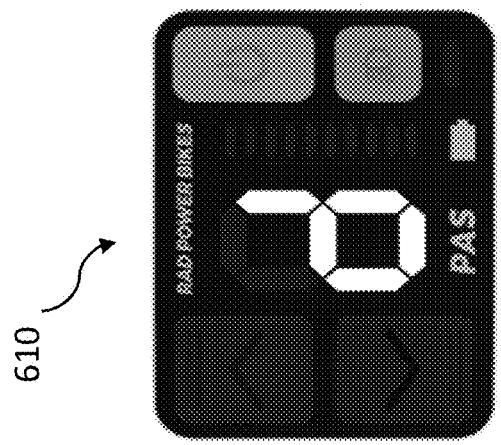
Figure 6C:
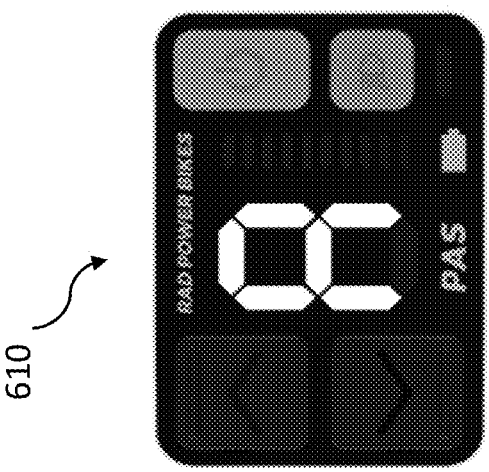
Figure 6B:
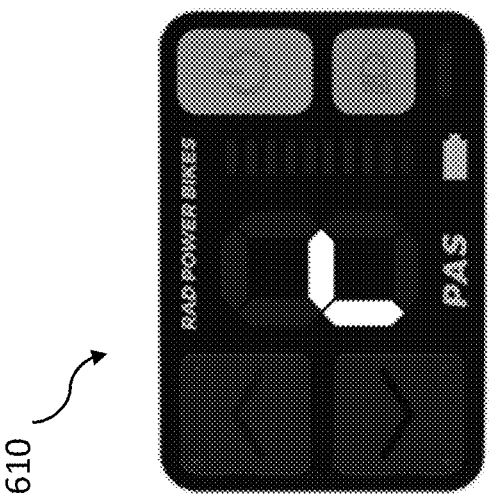

FIGS. 6B-6D present a startup mode of operation, where a user interface 610 of the control device 110 presents, via the PAS level indicator 455, letters that indicate an initiated startup sequence (e.g., "r", "A", "d"). For example, when the rider begins a ride, the rider can press the power button 430 of the control device 110, and the control device 110 presents, via the alphanumeric display of its user interface, information that indicates the control system of the electric bicycle 100 is in startup mode.

Figure 6F:
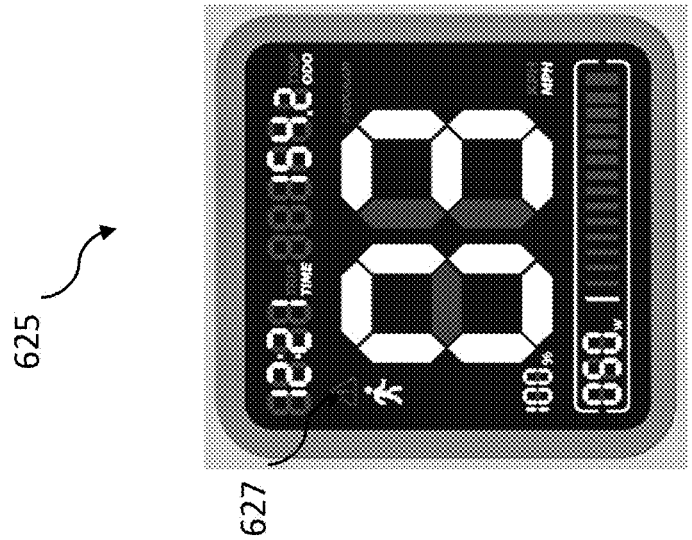
Figure 6E:
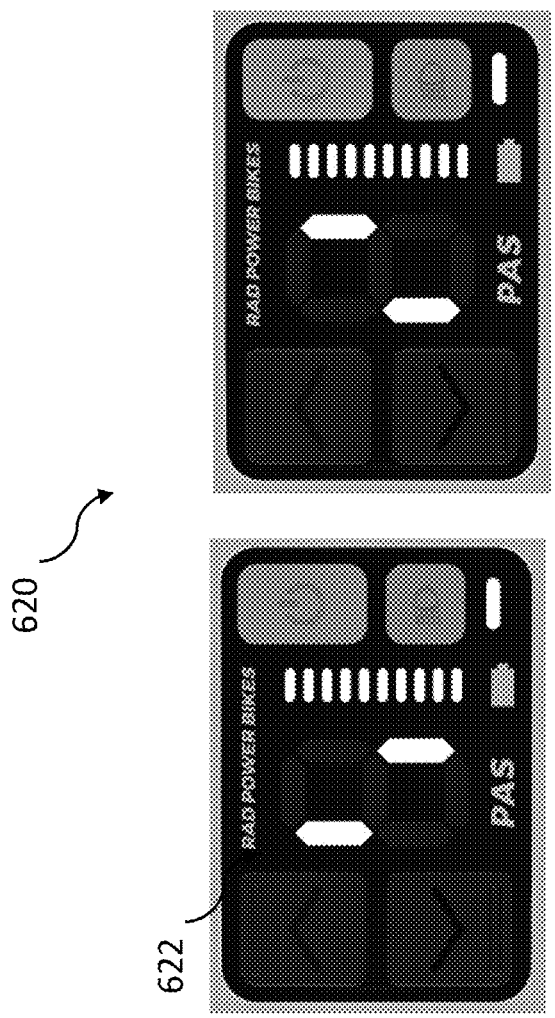

FIGS. 6E-6F present a walk mode of operation, where a user interface 620 of the control device 110 and/or a user interface 625 of the display device 120 presents information indicating the current mode of the electric bicycle 100 being the walk mode of operation (e.g., the rider is walking along side his/her/their e-bike). The control device 110, via the PAS indicator 455, displays symbols 622 that indicate the walk mode of operation. Similarly, the display device 120 displays a walking symbol 627 next to the current rate of speed of the e-bike.

Figure 6H:
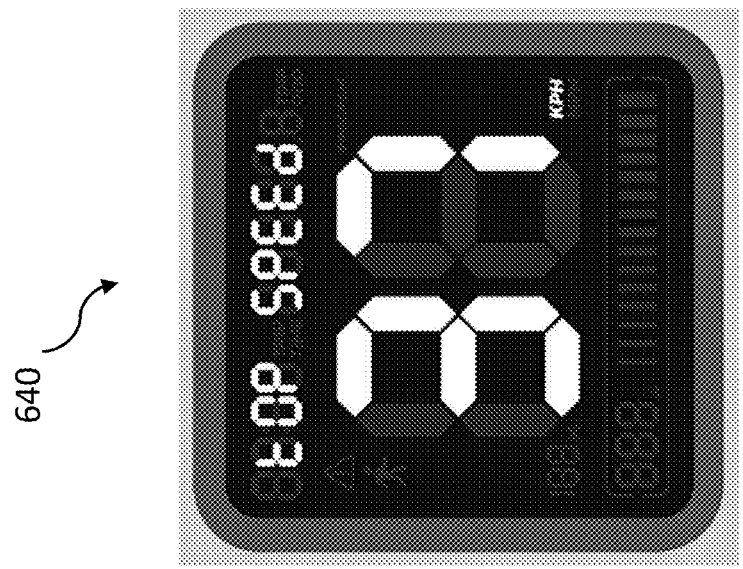
Figure 6G:
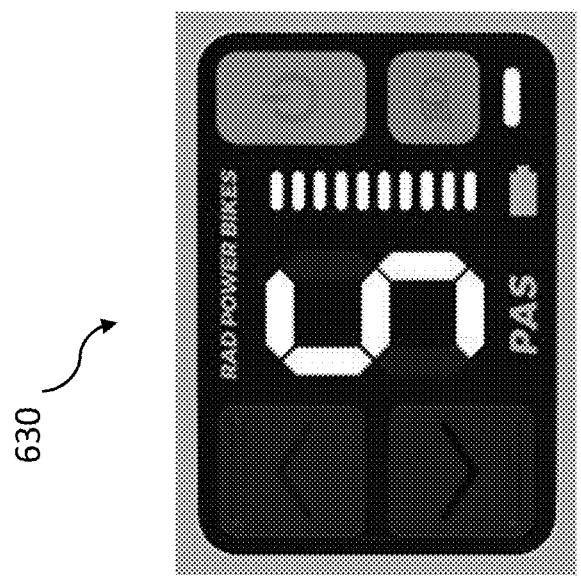

FIGS. 6G-6H present a service mode of operation, where a user interface 630 of the control device 110 and a user interface 640 of the display device 120 presents information associated with setting a top allowable speed for the electric bicycle 100 (or other user-configurable settings or parameters). As described herein, the rider can select the service mode of operation by providing input indicating the selection (e.g., double pressing the power button 430, which causes the "S" to be displayed by the PAS indicator 455). The display device 120, via the user interface 640, presents a current value for the parameter or setting to be adjusted (e.g., the top speed for the e-bike, based on bike class limits, local regulations, user preferences, fleet preferences, and so on). The rider can utilize the control buttons 425 of the control device 110 to increase/decrease the top speed value (within class or local regulations or standards), which is adjusted and displayed via the displayed device 120.

In some cases, the control device 110 facilitates the use of service mode while in programming mode. The following is an example input sequence to cause the control device 110 to adjust its parameters/settings:

The service mode is entered by pressing and holding the control buttons 425 (e.g., Up Arrow, Down Arrow) and lights button 430 at the same time for 10 seconds. At the end of the 10 second period, the control device 110 flashes the lights indicator 440 on for 750 ms, then off for 750 ms, then turns the lights indicator 440 on. The control device 110 then displays an "S" via the PAS indicator 455, and the display device 120 displays "tOP SPEEd" and the current max speed setting in KPH (kilometers per hour).

Of course, the control device 110 can follow other sequences during programming or service modes of operation and can utilize such modes of operation to adjust a variety of different setting or parameters. For example, the control device 110 can facilitate setting of the wheel diameter (when new wheels are fitted to the e-bike), a top wattage setting, the units of measurement displayed by the control device 110, and so on.

Figure 6J:
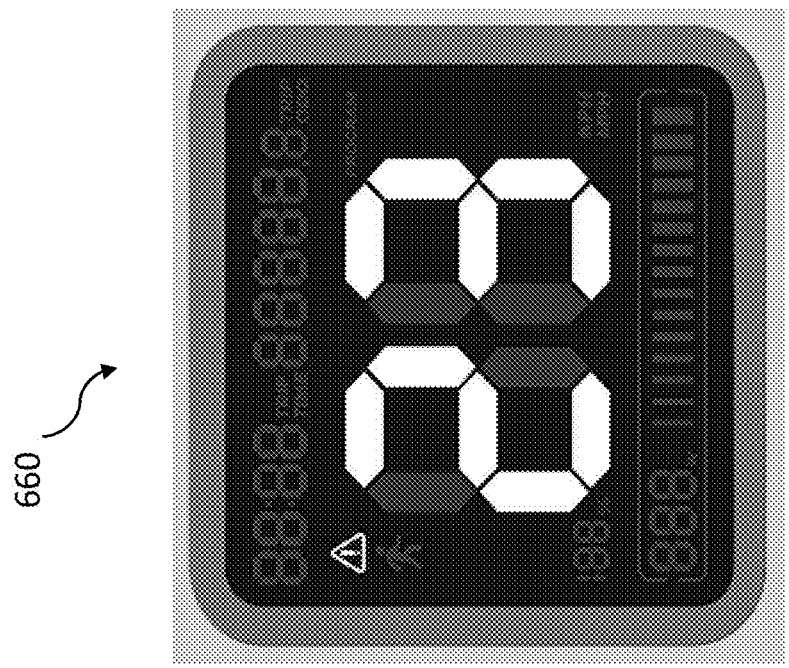
Figure 6I:
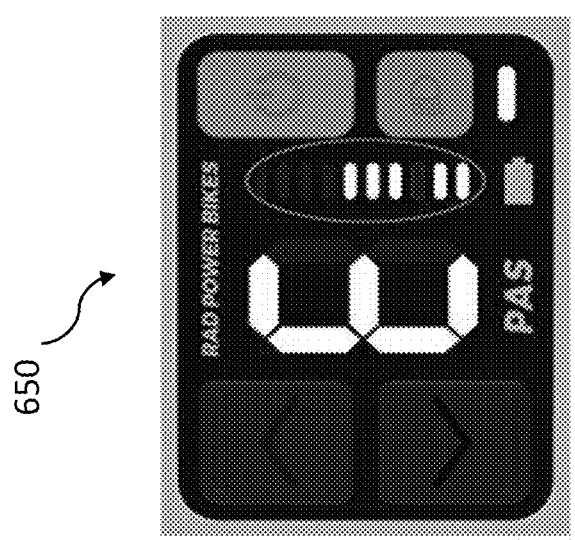

FIGS. 6I-6J depict the presentation of error code information via the control device 110 and/or the display device 120. For example, FIG. 6I presents an interface 650 where the PAS indicator 455 displays an "E" to indicate the presented information is an error code, and the battery level indicator 457 displays the error code (e.g., a code of "23," represented by a group of two bars and a group of three bars). Similarly, an interface 660 of the display device can also display the error code (e.g., the number "23" along with an error symbol).

Thus, as described herein, the control device 110 is configured to display various types of information to a rider of an electric bicycle via the user interface and associated alphanumeric display. FIG. 7 is a flow diagram illustrating a method 700 of presenting information to a rider of the electric bicycle via the user interface of the control device 110. The method 700 may be performed by the control device 110 and, accordingly, is described herein merely by way of reference thereto. It will be appreciated that the method 900 may be performed on any suitable hardware.

In operation 710, the control device 110 receives a selection of a mode of operation for the control device 110. For example, the control device 110 can receive input from a rider (via a sequence of input provided via the buttons) to modify operation to a service mode of operation of the control device 110.

In operation 720, the control device 110 displays a status of the mode of operation via a pedal assist system (PAS) indicator of the control device 110. For example, during normal modes of operation of the e-bike, the PAS indicator, which is an alphanumeric display, presents a PAS level value (e.g., 1-5) to the rider. However, during a different mode of operation, the control device 110 display the status of the mode of operation via a symbol or sequence of symbols indicative of the selected mode of operation. Some examples include:

displaying an "S" during a service mode of operation of the e-bike or device;

displaying a "P" during a programming mode of operation of the e-bike or device;

displaying an "E" to indicate a diagnostic mode of operation of the e-bike or device (where an error code is also displayed);

displaying a series of vertically moving symbols to indicate a walk mode of the e-bike; and so on.

In operation 730, the control device 110 and/or display device 120 presents mode information. For example, the control device 110 can present information via the battery level indicator 457 (e.g., error code values). As another example, the display device, as described herein, can display information about parameters being adjusted, settings being modified, as well as complementary information to information displayed by the control device 110.

Thus, as described herein, the control device 110 is configured to provide a rider with an interface to view and adjust levels of operation of the electric bicycle (e.g., PAS levels) while gripping the handlebars of the electric bicycle. Further, the control device 110 enables riders to adjust parameters and view diagnostic information for the electric bicycle 100 via the alphanumeric display. The control device 110, therefore, can be a small device that functions to present information via a bright, useful alphanumeric display, while being adaptable to facilitate other functionalities with respect to the electric bicycle for the rider, among other benefits.

Example Embodiments of the Technology

As described herein, the technology can include a control device, an associated display device, a control system of devices, and/or other components configured to electrically assist a rider when riding an electric bicycle.

For example, in some embodiments, a control device for an electric bicycle includes a housing, an attachment arm fixed to the housing and configured to removably attach the control device to handlebars of an electric bicycle, and a user interface. The user interface includes an LED display that presents control information associated with controlling electrically assisted movement of the electric bicycle, and one or more control buttons configured to receive input from a rider of the electric bicycle associated with the electrically assisted movement of the electric bicycle.

The control device can be configured communicate with a controller of the electric bicycle to cause the controller to adjust a level of the electrically assisted movement of the electric bicycle in response to the input received form the rider via the one or more control button, where the LED display is an alphanumeric display that presents a peddle assist system (PAS) level value indicative of the adjusted level of the electrically assisted movement of the electric bicycle.

The user interface can include two display surfaces, including a first surface that includes the one or more control buttons, and a second surface, proximate to the first surface, which includes the LED display, where the second surface is positioned at an angle relative to the first surface. Thus, the one or more control buttons can be disposed on a front surface of the user interface on a plane that intersects at an angle with a plane of the user interface that includes the LED display.

The one or more control buttons can include a raised element on top surfaces of the one or more control buttons, where the one or more control buttons have a triangular shape that slopes from an edge of the user interface to a center of the user interface.

The LED display can include an alphanumeric display that presents a peddle assist system (PAS) level value indicative of a current or selected level of the electrically assisted movement of the electric bicycle, and a bar indicator that presents a current power level of a battery of the electric bicycle.

The control device can also include a power button that, when selected, causes a control system of the electric bicycle to power on, and a lights button that, when selected, causes lights of the electric bicycle to turn on.

The LED display can include a 7 segment alphanumeric LED display that presents a peddle assist system (PAS) level value indicative of a current or selected level of the electrically assisted movement of the electric bicycle.

As another example, in some embodiments, a control system for an electric bicycle includes a control device and display device. The control device includes an LED display that presents control information associated with controlling electrically assisted movement of the electric bicycle, and one or more control buttons configured to receive input from a rider of the electric bicycle associated with the electrically assisted movement of the electric bicycle. The display device can be associated with, but separate from, the control device, and present information indicative of the electrically assisted movement of the electric bicycle.

The control device can be configured to be mounted to handlebars of the electric bicycle at a location that includes a brake lever, and the display device can be configured to be mounted to a center section of the handlebars of the electric bicycle.

In some cases, the control device includes two display surfaces, including a first surface that includes the one or more control buttons, and a second surface, proximate to the first surface, which includes the LED display, where the second surface is positioned at an angle relative to the first surface.

The control device can cause the display device to present information indicative of the electrically assisted movement of the electric bicycle that is complementary to information presented by the LED display of the control device.

In some cases, the control device presents a peddle assist system (PAS) level value indicative of a current level of the electrically assisted movement of the electric bicycle, and the display device presents power level information associated with electric power supplied to a motor of the electric vehicle when performing the electrically assisted movement of the electric bicycle.

In some cases, the control device presents charge information indicating a current level of charge of an electric battery of the electric bicycle, and the display device presents power level information associated with electric power supplied to a motor of the electric vehicle by the electric battery when performing the electrically assisted movement of the electric bicycle.

In some cases, the control device presents a peddle assist system (PAS) level value indicative of a current level of the electrically assisted movement of the electric bicycle, and the display device presents speed information that indicates a current traveling speed of the electric bicycle.

The control device can include a power button that, when selected, causes a control system of the electric bicycle to power on, where display device powers on in response to selection of the power button of the control device.

In some embodiments, the control device performs a method of determining a user of the electric bicycle has selected a mode of operation of the control device not associated with riding the electric bicycle, and presenting, via an alphanumeric display of the control device, a symbol indicative of the selected mode of operation, where the alphanumeric display, during a mode of operation associated with riding the electric bicycle, presents a number indicating a current peddle assist system (PAS) level applied to movement of the electric bicycle.

In some cases, the selected mode of operation of the electric bicycle is a settings mode of operation of the electric bicycle and presenting a symbol indicative of the selected mode of operation includes displaying a P symbol to the user via the alphanumeric display.

In some cases, the selected mode of operation of the electric bicycle is a walk mode of operation of the electric bicycle and presenting a symbol indicative of the selected mode of operation includes displaying a sequence of symbols to the user via the alphanumeric display that indicate the walk mode of operation.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or", in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the electric bike and bike frame may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

From the foregoing, it will be appreciated that specific embodiments have been described herein for purposes of illustration, but that various modifications may be made without deviating from the spirit and scope of the embodiments. Accordingly, the embodiments are not limited except as by the appended claims.

What is claimed is:

1. A control device for an electric bicycle, the control device comprising:
   a housing;
   an attachment arm fixed to the housing and configured to removably attach the control device to handlebars of an electric bicycle; and
   a user interface on a front of the housing and having two display surfaces, wherein the user interface includes:
   a first planar surface that includes an LED display that presents control information associated with controlling electrically assisted movement of the electric bicycle,
   wherein the LED display is an alphanumeric display that presents:
   a peddle assist system (PAS) level value indicative of a level of electrically assisted movement of the electric bicycle during a mode of operation associated with riding the electric bicycle, and
   a sequence of vertically moving symbols during a mode of operation associated with walking the electric bicycle; and
   a second planar surface, positioned at an angle of 8-20 degrees relative to the first planar surface, that includes one or more control buttons configured to receive input from a rider of the electric bicycle associated with the electrically assisted movement of the electric bicycle.

2. The control device of claim 1, wherein the control device is configured to communicate with a controller of the electric bicycle to cause the controller to adjust the level of the electrically assisted movement of the electric bicycle in response to the input received form the rider via the one or more control button.

3. The control device of claim 1, wherein the one or more control buttons include a raised element on top surfaces of the one or more control buttons, and wherein the one or more control buttons have a triangular shape that slopes from an edge of the user interface to a center of the user interface.

4. The control device of claim 1, wherein the LED display includes:
   a bar indicator that presents a current power level of a battery of the electric bicycle.

5. The control device of claim 1, further comprising:
   a power button that, when selected, causes a control system of the electric bicycle to power on; and
   a lights button that, when selected, causes lights of the electric bicycle to turn on.

6. The control device of claim 1, wherein the LED display includes a 7 segment alphanumeric LED display that presents a peddle assist system (PAS) level value indicative of a current or selected level of the electrically assisted movement of the electric bicycle.

7. A control system for an electric bicycle, the control system comprising:
  a control device, wherein the control device includes:
    a first planar surface that includes an LED display that presents control information associated with controlling electrically assisted movement of the electric bicycle,
      wherein the presented control information includes a peddle assist system (PAS) level value indicative of a level of the electrically assisted movement of the electric bicycle during a mode of operation associated with riding the electric bicycle and a sequence of vertically moving symbols during a mode of operation associated with walking the electric bicycle; and
    a second planar surface, positioned at an angle of 8-20 degrees relative to the first planar surface, that includes one or more control buttons configured to receive input from a rider of the electric bicycle associated with the electrically assisted movement of the electric bicycle; and
  a display device associated with, but separate from, the control device, wherein the display device presents information indicative of the electrically assisted movement of the electric bicycle.

8. The control system of claim 7, wherein the control device is configured to be mounted to handlebars of the electric bicycle at a location that includes a brake lever; and
  wherein the display device is configured to be mounted to a center section of the handlebars of the electric bicycle.

9. The control system of claim 7, wherein the control device is configured communicate with a controller of the electric bicycle to cause the controller to adjust the level of the electrically assisted movement of the electric bicycle in response to the input received form the rider via the one or more control buttons; and
  wherein the LED display is an alphanumeric display that presents the PAS level value indicative of the adjusted level of the electrically assisted movement of the electric bicycle.

10. The control system of claim 7, wherein the control device causes the display device to present information indicative of the electrically assisted movement of the electric bicycle that is complementary to information presented by the LED display of the control device.

11. The control system of claim 7, wherein the display device presents power level information associated with electric power supplied to a motor of the electric vehicle when performing the electrically assisted movement of the electric bicycle.

12. The control system of claim 7, wherein the control device presents charge information indicating a current level of charge of an electric battery of the electric bicycle; and
  wherein the display device presents power level information associated with electric power supplied to a motor of the electric vehicle by the electric battery when performing the electrically assisted movement of the electric bicycle.

13. The control system of claim 7, wherein the control device includes:
  a power button that, when selected, causes a control system of the electric bicycle to power on,
    wherein the display device powers on in response to selection of the power button of the control device.

14. The control system of claim 7, wherein the display device presents speed information that indicates a current traveling speed of the electric bicycle.

15. A method performed by a control device of an electric bicycle, the method comprising:
  determining a user of the electric bicycle has selected a mode of operation of the electric bicycle via the control device; and
  presenting, via an alphanumeric display of the control device, a symbol indicative of the selected mode of operation,
    wherein the alphanumeric display, during a mode of operation associated with riding the electric bicycle, presents a number indicating a current peddle assist system (PAS) level applied to movement of the electric bicycle; and
    wherein the alphanumeric display, during a walk mode of operation associated with walking the electric bicycle, presents a sequence of vertically moving symbols to the user via the alphanumeric display that indicate the walk mode of operation.

16. The method of claim 15, wherein the selected mode of operation of the electric bicycle is a settings mode of operation of the electric bicycle; and wherein presenting a symbol indicative of the selected mode of operation includes displaying a P symbol to the user via the alphanumeric display.

* * * * *